Reissued Sept. 4, 1951

Re. 23,405

UNITED STATES PATENT OFFICE 23,405

NITRO-(2'-THENOYL)-ALKYL BENZOATES

Edward K. Gladding, Greenville, Del., assignor to E. I. du Pont de Nemours & Company, Wilmington, Del., a corporation of Delaware No Drawing. Original No. 2,519,040, dated August 15, 1950, Serial No. 71,203, January 15, 1949. Application for reissue February 9, 1951, Serial No. 210,278

8 Claims. (Cl. 260—332.2)

Matter enclosed in heavy brackets [ ] appears in the original patent but forms no part of this reissue specification; matter printed in italics indicates the additions made by reissue.

This invention relates to the preparation of new substituted 2-(2'-thenoyl)-benzoic acid alkyl esters and the free acids obtainable therefrom, and more particularly to an improved process for the preparation of nitro-2-(2'-thenoyl)-benzoic acid alkyl esters, which may carry chlorine or bromine in the 5'-position of the thiophene nucleus. The new compounds of this invention have the formula:

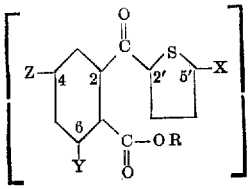

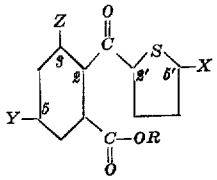

wherein

Y or Z=$NO_2$

X=H, Cl or Br, and

R=an alkyl group containing from 1 to 4 carbon atoms.

The remaining substitutable positions of the benzene and thiophene rings are understood to be occupied by hydrogen.

The literature describes methods by means of which simple acyl halides, such as acetyl chloride and benzoyl chloride, can be condensed with thiophene in the presence of anhydrous stannic chloride as catalyst to produce high yields of the respective ketones. According to G. Stadnikov and I. Goldfarb [Ber. 61B, 2341–42 (1928)], the dropwise addition of [anyhydrous] *anhydrous* stannic chloride to a solution of benzoyl chloride and thiophene in benzene as solvent leads to the production of 2-benzoylthiophene in yields of 82.5% of theory. These authors observed that an oily, insoluble, tin-containing intermediate was formed during the course of the reaction. Similar experiments have been described, and similar results obtained, by G.

Stadnikov and V. Rakovski (Chem. Abs. 22, 1774) and Y. Goldfarb (Chem. Abs. 25, 2719), among others.

With various substituted acid chlorides, the process of G. Stadnikov and I. Goldfarb described above gives very poor yields of very poor quality products. For example, the dropwise addition of anhydrous stannic chloride to a benzene solution of 2-carbomethoxy-3-nitrobenzoyl chloride and thiophene gave inconsistent yields of from 32% to 43% of the theoretical of [6-nitro-2-(2'-thenoyl)-benzoic] *3-nitro-2-(2'-thenoyl)-benzoic* acid methyl ester (as determined by hydrolysis of the crude product to the free acid) and the methyl ester, as obtained, was always badly contaminated with dark colored tarry polymeric materials. Furthermore, during the course of the reaction a tin-containing intermediate separated from the reaction mass in the form of a thick, heavy, black tar which solidified on the walls of the reaction vessel and which could be removed only with great difficulty, which makes the process totally inoperable on a technical scale.

Some improvement in yield and quality of product can be realized [my] *by* modifying the reaction conditions. Thus, by interchanging the order of addition of anhydrous stannic chloride and thiophene in the process of Stadnikov and Goldfarb, the yield of [6-nitro-2-(2'-thenoyl)-benzoic] *3-nitro-2-(2'-thenoyl)-benzoic* acid methyl ester (as determined by hydrolysis of the crude product to the free acid) obtained by condensing 2-carbomethoxy-3-nitrobenzoyl chloride with thiophene was increased from 32% to 43% of the theoretical to 68%. The ester, however, was contaminated with dark colored, tarry, polymeric materials and an insoluble tin-containing intermediate separated from the reaction mass as the condensation progressed.

It is an object of this invention to prepare nitro-2-(2'-thenoyl)-benzoic acid alkyl esters, which may carry halogen as a substituent in the 5'-position of the thiophene nucleus. A further objective of this invention is to provide an improved manufacturing process for the production of these new compounds, which is economically feasible and which produces them in high yield and of good quality.

The new compounds of the present invention are important basic intermediates in the synthesis of new dyes and further new dye intermediates. For example, the alkyl esters may be hydrolyzed readily, in substantially quantitative yield, to the corresponding nitro-2-(2'-thenoyl)-benzoic acids which, in turn, may be ring-closed and reduced, or, alternatively, reduced and ring-closed to [5- or 6-]aminothiophanthraquinones carrying, as substituents in the 2-position of the thiophanthraquinone nucleus, hydrogen, chlorine or bromine. These thiophanthraquinone compounds are, in themselves, dyes for cellulose acetate and they may be reacted upon further to produce dyes for cellulose acetate, wool, synthetic polyamide fibers and cellulosic fibers.

The present invention involves the condensation of 2-carboalkoxy-(3 or 5)-nitrobenzoyl chloride with thiophene (or 2-chloro- or 2-bromothiophene) in the presence of stannic chloride as catalyst and with a molar equivalent or more of phosphorus oxychloride present in the reaction system.

I have found that, where the condensation of the nitrobenzoic acid ester with thiophene is carried out in a similar manner to that described by Stadnikov and Goldfarb but with the addition of a molar equivalent of phosphorus oxychloride prior to the addition of the anhydrous stannic chloride, a materially increased yield of the nitro-2-(2'-thenoyl)-benzoic acid alkyl ester is obtained, and that no tin-containing complex separates out during the process, the reaction mass remaining homogeneous throughout the course of the condensation. A still further increase in the yield and purity of the resulting product is obtained by changing the order of addition of the anhydrous stannic chloride and thiophene, as pointed out above, when at least a molecular equivalent of phosphorus oxychloride is introduced into the reaction mass prior to the thiophene. Under these conditions, a yield of from 83% to 86% of the theoretical of [6-nitro-2-(2'-thenoyl)-benzoic] 3-nitro-2-(2'-thenoyl)-*benzoic* acid methyl ester is obtainable. The crude ester is crystalline, light in color, and contains only small amounts of polymeric impurities. Again the reaction mass remains homogeneous throughout the course of the condensation.

The exact operation of the phosphorus oxychloride in the reaction is not understood. It is possible that the mixture of phosphorus oxychloride and benzene is a more powerful solvent for the tin-containing intermediate than benzene alone and thus holds the intermediate in solution, although it appears more likely that the anhydrous stannic chloride and phosphorus oxychloride form a molecular addition compound which serves to catalyze the reaction but which does not combine with the product to form an insoluble intermediate.

The following examples are given to illustrate the invention. The parts used are by weight, unless otherwise designated.

Example 1

One (1.00) part of 2-carbomethoxy-3-nitrobenzoic acid suspended and agitated in 1.96 parts of benzene was treated at room temperature with 1.02 parts of phosphorus pentachloride to convert the acid to the acid chloride. A vigorous reaction set in as soon as the phosphorus pentachloride was added and much hydrogen chloride was evolved. The reaction was completed by heating the charge to 60°–65° C. for 5 to 10 minutes. Formation of the acid chloride took place according to the following equation:

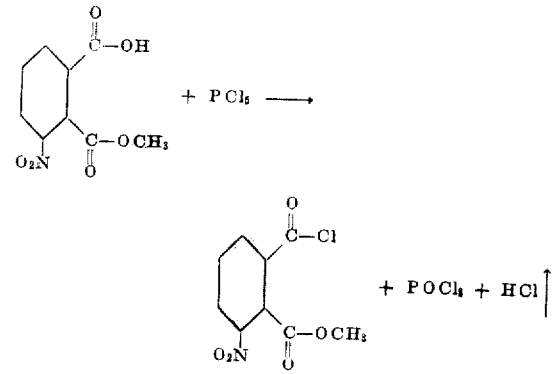

The resulting solution of 2-carbomethoxy-3-nitrobenzoyl chloride, containing a molar equivalent of phosphorus oxychloride, was cooled to 10° C. and 1.32 parts of anhydrous stannic chloride were introduced.

A solution of 0.403 part of thiophene in 1.96 parts of benzene was added to the charge dropwise during 45 minutes while the temperature was maintained in the range of 10°–15° C. [Condensation of the acid chloride with the thiophene occurred according to the following equation:]

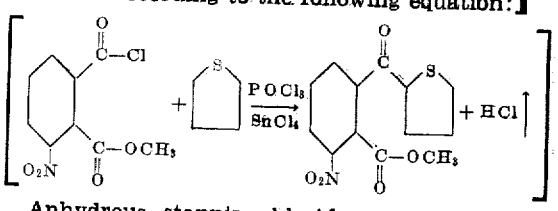

Anhydrous stannic chloride and phosphorus oxychloride were destroyed by treating the reaction mass with a solution of 0.524 part of concentrated hydrochloric acid in 2.22 parts of water.

Upon steam-distilling the mass free of benzene, [6-nitro-2-(2'-thenoyl)-benzoic] *3-nitro-2-(2'-thenoyl)-benzoic* acid methyl ester separated as a heavy oil which crystallized quickly to a tan colored solid and which was separated by filtration, slurried in a dilute solution of sodium bicarbonate, filtered, washed with water and dried. The yield was 1.11 parts, equal to 86% of the theoretical. A portion of the product was recrystallized twice—first from 50% aqueous dimethyl formamide and then from 50% aqueous dimethyl formamide and then from butyl alcohol—giving the ester in the form of small colorless prisms which melted in the range of 128.6 to 129.9° C.

The crude ester was then slurried for 12 hours at room temperature with 8.9 parts of 50% aqueous alcohol and 1.73 parts of 30% aqueous sodium hydroxide. The resulting solution of the sodium salt of [6-nitro-2-(2'-thenoyl)-benzoic] *3-nitro-2-(2'-thenoyl)-benzoic* acid was filtered to remove a small amount of alkali insoluble material and made strongly acid by the slow addition of excess concentrated hydrochloric acid. The precipitated crystalline [6-nitro-2-(2'-thenoyl)-benzoic] *3-nitro-2-(2'-thenoyl)-benzoic* acid as the free acid was filtered, washed with cold water and dried. The yield was 1.02 parts, equal to 83% of the theoretical.

Example 2

To 1.00 part of 2-carbomethoxy-3-nitrobenzoic acid suspended and agitated in 2.45 parts of monochlorobenzene there was added, carefully and in small portions, 1.02 parts of phosphorus pentachloride. The reaction was vigorous. Much hydrogen chloride was evolved and the temperature rose slowly to 35° C. at which point all of the starting material had gone into solution. The reaction was completed by heating the charge to 65° C. for several minutes.

The resulting solution of 2-carbomethoxy-3-nitrobenzoyl chloride, containing a molar equivalent of phosphorus oxychloride, was cooled to 8° C. and 1.32 parts of anhydrous stannic chloride were dropped in during about 15 minutes.

The temperature of the charge was adjusted to 10°–15° C., and, during 45 minutes, a solution of 0.385 part of thiophene in 2.45 parts of monochlorobenzene was added. After holding the reaction mass at 10°–15° C. for a further 45 minutes, it was poured into 9 parts of ice and water. The organic layer was separated and washed with 3% aqueous hydrochloric acid. The resulting [6 - nitro - 2 - (2' - thenoyl) - benzoic] *3-nitro-2-(2'-thenoyl)-benzoic* acid methyl ester crystallized from the organic phase. The yield was 1.03 parts (80% of the theoretical), as measured by the quantity of [6 - nitro - 2 - (2' - thenoyl) - benzoic] *3-nitro-2-(2'-thenoyl)-benzoic* acid obtained by hydrolysis of the ester with alkali as described in Example 1.

In the procedure of Example 1, an equivalent quantity of 2-chlorothiophene was substituted for the thiophene. The product, [6-nitro-2-(5'-chloro-2'-thenoyl)-benzoic] *3-nitro-2-(5'-chloro-2'-thenoyl)-benzoic* acid methyl ester, separated from the steam-distilled mass as a granular solid, which, after two recrystallizations, first from aqueous dimethyl formamide and then from ethyl alcohol, melted in the range of 139.6°–140.6° C. As measured by the quantity of [6-nitro-2-(5'-chloro-2'-thenoyl)-benzoic] *3-nitro-2-(5'-chloro-2'-thenoyl)-benzoic* acid obtained by hydrolysis of the crude ester, the yield was 0.84 part (58% of the theoretical).

Example 4

In the procedure of Example 1, an equivalent quantity of 2-bromothiophene was substituted for the thiophene. The product, [6-nitro-2-(5'-bromo-2'-thenoyl)-benzoic] *3-nitro-2-(5'-bromo-2'-thenoyl)-benzoic* acid methyl ester, separated from the steam-distilled mass as an oil which solidified on standing. After two recrystallizations from aqueous ethanol, the ester was obtained as a highly crystalline solid which melted at about 135° C. As measured by the quantity of [6-nitro-2-(5'-bromo-2'-thenoyl)-benzoic] *3-nitro-2-(5'-bromo-2'-thenoyl)-benzoic* acid obtained by hydrolysis of the crude ester, the yield was 0.44 part (28% of the theoretical).

Example 5

To 1.00 part of 2-carbomethoxy-5-nitrobenzoic acid suspended and agitated in 2.94 parts of ortho-dichlorobenzene there was added, under 25° C., 1.02 parts of phosphorus pentachloride. After the vigorous reaction had subsided, the charge was allowed to stand at room temperature for about 12 hours. The resulting solution of 2-carbomethoxy-5-nitrobenzyl chloride, containing a molar equivalent of phosphorus oxychloride, was cooled to about 0° C. and 0.68 part of phosphorus oxychloride and 1.32 parts of stannic chloride were added.

The temperature of the charge was readjusted to 0° C. and, during 2 hours and 10 minutes, a solution of 0.385 part thiophene in 2.94 parts of ortho-dichlorobenzene was introduced. After holding the reaction mass at 0° C. for another hour it was poured into 9 parts of ice and water. The organic layer was separated, washed 5 times with dilute aqueous hydrochloric acid, and, finally, steam-distilled free of ortho-dichlorobenzene. The yield of crude product, [4-nitro-2-(2'-thenoyl)-benzoic] *5-nitro-2-(2'-thenoyl)-benzoic* acid methyl ester, was 1.15 parts. After two crystallizations, first from ortho-dichlorobenzene and then from butanol, the product melted at about 160° C.

Hydrolysis of the crude ester, as described in Example 1, gave 0.86 part (70% of the theoretical) of [4-nitro-2-(2'-thenoyl)-benzoic] *5-nitro-2-(2'-thenoyl)-benzoic* acid.

As illustrated by Examples 1 to 5, it is convenient to prepare the acid chloride "in situ" by reacting the free acid—either 2-carbomethoxy-(3 or 5)-nitrobenzoic acid—with phosphorus pentachloride in the desired inert solvent. Thus, a molar equivalent of phosphorus oxychloride is introduced automatically into the reaction system as a consequence of acid chloride formation. This procedure has the important technological advantage of avoiding the otherwise necessary separate step of preparing and isolating the relatively unstable acid chloride. In some cases, particularly when chlorinated inert solvents (such as ortho-dichlorobenzene), are used, it is desirable to add another molar equivalent, or more, of phosphorus oxychloride to the reaction mass to insure homogeneity during condensation.

The process as described in Examples 1 to 5 operates satisfactorily when between 1.0 and 1.5 mols of thiophene per mol of acid chloride are employed. However, with the smaller quantity of thiophene cleaner products result and, for this reason, 1.0 mol of thiophene per mol of acid chloride represents the preferred usage. Quantities of thiophene in excess of 1.5 mols/mol may be used if desired, but the nitrothenoylbenzoic acid alkyl esters so produced will be contaminated to a greater extent with polymeric impurities.

The length of time during which the thiophene solution is added to the reaction mass is not critical. Entirely satisfactory results are obtained with times of addition varying from 45 minutes to 2½ hours. As the condensation reaction is exothermic, such practical considerations as the cooling capacity of the reaction system will determine the optimum addition time.

It is preferred to operate the process in such manner that the completed condensation mass contains about 1 part of product (based on the theoretical yield) per 3 to 5 parts of inert solvent, because, under these circumstances, temperature control is obtained readily and the mass remains fluid so that it may be transferred readily from one piece of equipment to another. Satisfactory operation, however, can be obtained with larger or smaller quantities of solvent.

As inert solvents, aromatic or aliphatic hydrocarbons, aromatic or aliphatic chlorinated hydrocarbons, or aromatic nitrated hydrocarbons may be employed. For example, satisfactory results have been obtained with benzene, monochlorobenzene, orthodichlorobenzene, nitrobenzene, tetrachlorethane and carbon tetrachloride. Preferred solvents are monochlorobenzene and orthodichlorobenzene because they are readily removed and recovered from the reaction mass by steam-distillation and because they present no great fire hazard when employed on a technical scale.

The anhydrous stannic chloride used may be varied from about 0.55 to 1.1 mols per mol of acid chloride or more without affecting greatly either the yield or quality of the product. The use of amounts of anhydrous stannic chloride larger than 1.1 mols per mol has no advantage. The use of amounts smaller than about 0.55 mol per mol results in decreased yields.

Preferred condensation temperatures are those between 0° C. and 20° C. Higher temperatures may be used, but a slight decrease in yield is noted when the temperature is increased too much above 20° C.

The intermediates, 2-carboalkoxy-(3 or 5)-nitrobenzoic acids, are easily prepared by known methods by reacting the readily available 3- or 4-nitrophthalic anhydrides with an aliphatic alcohol. Thus, by refluxing 3-nitrophthalic anhydride with methyl alcohol there is produced 2-carbomethoxy-3-nitrobenzoic acid which is isolated easily by evaporating excess methyl alcohol from the reaction mass. Similarly, with ethyl alcohol, propyl alcohol and butyl alcohol there is obtained the corresponding 2-carboalkoxy-3-nitrobenzoic acid. The various carboalkoxy nitrobenzoic acids may be converted to the corresponding acid chlorides and reacted with thiophene compounds to produce nitrothenoylbenzoic acid alkyl esters by the methods given in Examples 1 to 5.

The 2-carboalkoxy-(3 or 5)-nitrobenzoyl chlorides are synthesized readily by treating the free acids with chlorinating agents such as thionyl chloride or phosphorus pentachloride.

I claim:

1. A process for preparing nitro-2-(2'-thenoyl)-benzoic acid alkyl esters which comprises reacting a 2-carboalkoxy-nitrobenzoyl chloride, which carries the nitro group in one of the positions 3- and 5- and in which the alkoxy group contains from 1 to 4 carbon atoms, with from 1.0 to 1.5 mols of a thiophene compound of the class consisting of thiophene, 2-chlorothiophene and 2-bromothiophene, in an inert organic solvent in the presence of 0.55 to 1.1 mol of anhydrous stannic chloride and at least 1 mol of phosphorus oxychloride, per mol of carboalkoxy-nitrobenzoyl chloride employed, the reaction being carried out at temperatures of from 0° to 20° C.

2. The process of claim 1 in which the thiophene compound is slowly added to the inert organic solvent solution of the carboalkoxy-benzoyl chloride, anhydrous stannic chloride and phosphorus oxychloride.

3. A process for preparing [6-nitro-2-(2'-thenoyl)-benzoic] *3- nitro- 2-(2'-thenoyl)-benzoic* acid methyl ester which comprises reacting the 2-carbomethoxy-3-nitrobenzoyl chloride with from 1.0 to 1.5 mols of thiophene in an inert organic solvent and in the presence of 0.55 to 0.1 mol of anhydrous stannic chloride and at least 1 mol of phosphorus oxychloride, per mol of the carbomethoxy-nitrobenzoyl chloride employed, the reaction being carried out at temperatures of from 0° to 20° C.

4. The process of claim 3 in which the thiophene is slowly added to the inert organic solvent solution of the carbomethoxy-nitrobenzoyl chloride, anhydrous stannic chloride and phosphorus oxychloride.

5. The nitro-2-(2'-thenoyl)-benzoic acid alkyl esters of the formula:

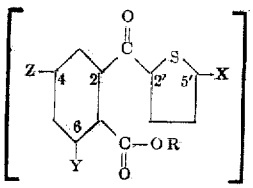

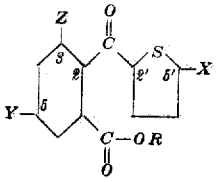

in which one of the [substitutents] *substituents* Y and Z is a $NO_2$ group and the other is hydrogen, and wherein X is a [substitutent] *substituent* of the group consisting of H, Cl and Br, and R is an alkyl group containing from 1 to 4 carbon atoms.

6. [6-nitro-2-(2'-thenoyl)-benzoic acid methyl ester.] *3 - nitro - 2-(2' - thenoyl)-benzoic acid methyl ester.*

7. [6 - nitro-2-(5'-chloro-2'-thenoyl)-benzoic acid methyl ester.] *3-nitro-2-(5'-chloro-2'-thenoyl)-benzoic acid methyl ester.*

8. [4-nitro-2-(2'-thenoyl)-benzoic acid methyl ester.] *5 - nitro - 2-(2' - thenoyl)-benzoic acid methyl ester.*

EDWARD K. GLADDING.

REFERENCES CITED

The following references are of record in the file of this patent or the original patent:

Smorganskii and Goldfarb, Chem. Abst. 35:4011 (1941).

Certificate of Correction

Reissue No. 23,405 September 4, 1951

EDWARD K. GLADDING

It is hereby certified that error appears in the printed specification of the above numbered patent requiring correction as follows:

Column 3, line 43, "3-nitro-2-(2′-thenoyl)" should be italics *3-nitro-2-(2′-thenoyl)*; column 5, between lines 28 and 29, insert the heading Example 3 ; line 68, for "nitrobenzyl" read nitrobenzoyl ; column 6, line 59, for "obtailned" read obtained :

and that the said Letters Patent should be read as corrected above, so that the same may conform to the record of the case in the Patent Office.

Signed and sealed this 13th day of November, A. D. 1951.

[SEAL]

THOMAS F. MURPHY,
*Assistant Commissioner of Patents.*